(12) United States Patent
Weh et al.

(10) Patent No.: US 9,868,423 B2
(45) Date of Patent: Jan. 16, 2018

(54) PRESSURE GENERATING APPARATUS FOR A BRAKING SYSTEM OF A MOTOR VEHICLE, HYDRAULIC ASSEMBLAGE FOR INTERACTING WITH THE PRESSURE GENERATING APPARATUS, BRAKING SYSTEM, AND METHOD FOR INSTALLING A BRAKING SYSTEM FOR A MOTOR VEHICLE

(71) Applicant: Robert Bosch GmbH, Stuttgart (DE)

(72) Inventors: Andreas Weh, Sulzberg (DE); Juergen Tandler, Fuessen (DE); Matthias Mayr, Rettenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 104 days.

(21) Appl. No.: 14/964,852

(22) Filed: Dec. 10, 2015

(65) Prior Publication Data
US 2017/0166177 A1 Jun. 15, 2017

(30) Foreign Application Priority Data
Dec. 11, 2014 (DE) ........................ 10 2014 225 595

(51) Int. Cl.
*B60T 13/16* (2006.01)
*B60T 8/40* (2006.01)

(52) U.S. Cl.
CPC ........... *B60T 8/4031* (2013.01); *B60T 8/4086* (2013.01)

(58) Field of Classification Search
CPC .... B60T 8/4086; B60T 8/4031; B60T 11/224; B60T 11/236; B60T 8/4018; B60T 8/4022; B60T 8/409; B60T 8/4036; B60T 13/74; F04C 15/0026; F04C 15/0019; F16D 2121/24; F16D 2125/40
USPC .......................................................... 303/10
See application file for complete search history.

(56) References Cited

U.S. PATENT DOCUMENTS

| 5,439,278 A * | 8/1995 | Tsukamoto | ........... B60T 8/4266 188/162 |
| 5,558,409 A * | 9/1996 | Walenty | .................. B60T 7/042 303/10 |
| 6,230,492 B1 * | 5/2001 | Kingston | ............... B60T 13/745 60/545 |

(Continued)

FOREIGN PATENT DOCUMENTS

| DE | 10 2008 002 740 | 12/2009 | | |
| WO | WO 008804741 A1 * | 6/1988 | ............ B60T 13/741 |
| WO | WO 2014086517 A1 * | 6/2014 | ............ B60T 8/4018 |

*Primary Examiner* — Anna Momper
*Assistant Examiner* — Mahbubur Rashid
(74) *Attorney, Agent, or Firm* — Norton Rose Fulbright US LLP; Gerard Messina

(57) ABSTRACT

A pressure generating apparatus for a braking system of a motor vehicle, a flange embodied on a second housing component adjacent to a first housing component, which flange is congruent with a flange-shaped portion of the first housing component, is mounted on the flange-shaped portion of the first housing component, and the second housing component completely surrounds a transmission gear set of the first housing component. Also described is a hydraulic assemblage for interacting with the pressure generating apparatus, to a braking system for a motor vehicle, and to a method for installing a braking system for a motor vehicle.

15 Claims, 6 Drawing Sheets

(56) References Cited

U.S. PATENT DOCUMENTS

| | | | | |
|---|---|---|---|---|
| 6,416,138 B1* | 7/2002 | Barnett | ................... | B60T 7/20 |
| | | | | 188/156 |
| 2003/0209940 A1* | 11/2003 | Inage | ................... | B60T 8/365 |
| | | | | 303/87 |
| 2008/0048492 A1* | 2/2008 | Sakai | ................... | B60T 8/26 |
| | | | | 303/113.1 |
| 2015/0298674 A1* | 10/2015 | Kratzer | ................... | B60T 7/042 |
| | | | | 303/10 |

* cited by examiner

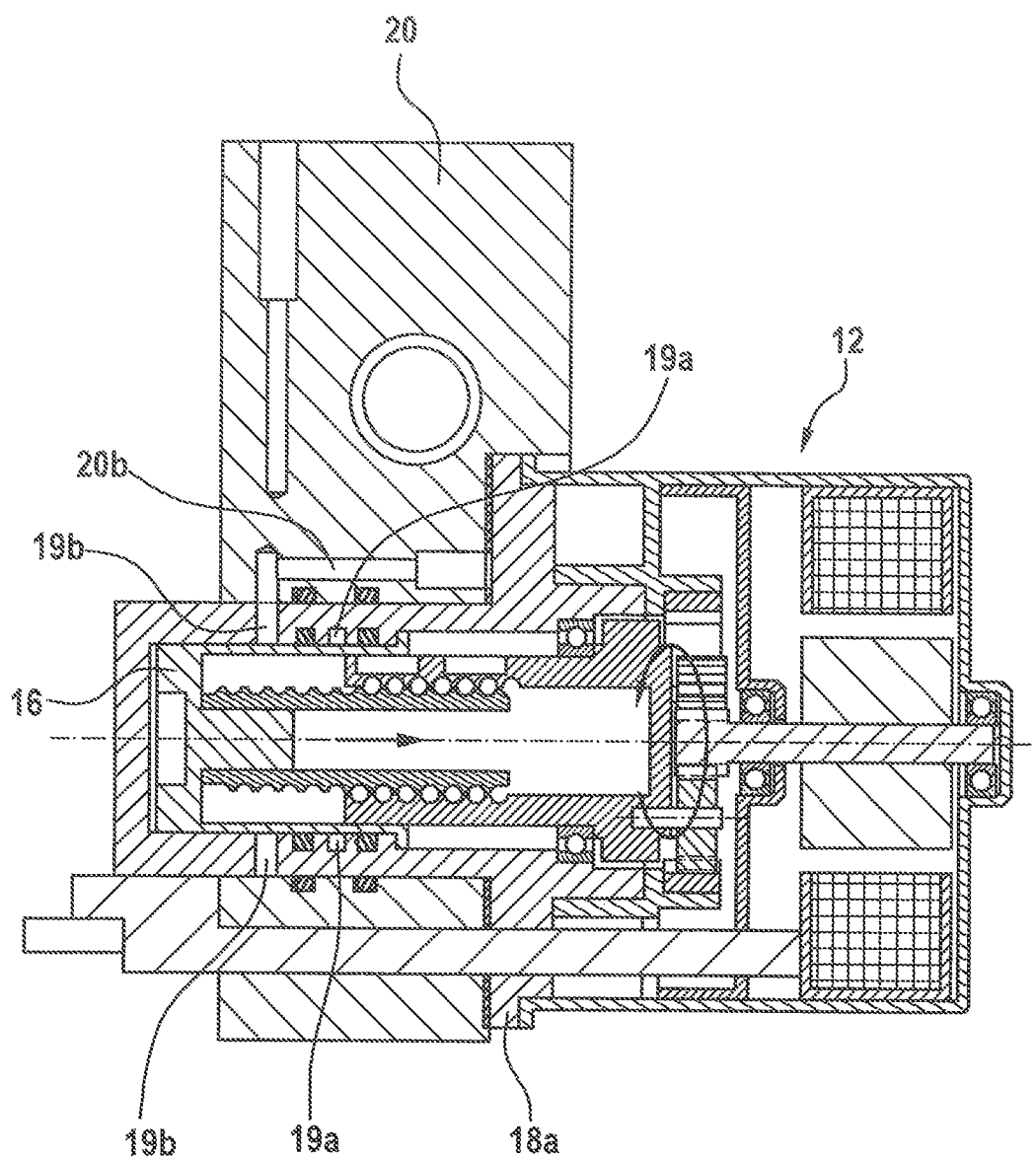

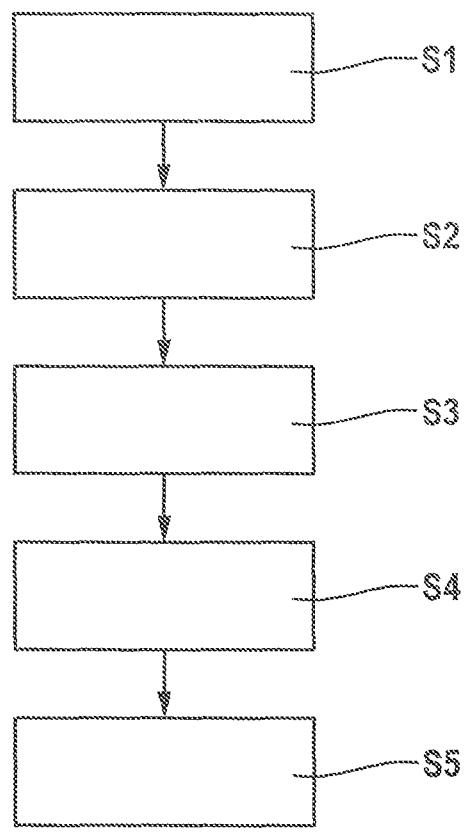

PRESSURE GENERATING APPARATUS FOR A BRAKING SYSTEM OF A MOTOR VEHICLE, HYDRAULIC ASSEMBLAGE FOR INTERACTING WITH THE PRESSURE GENERATING APPARATUS, BRAKING SYSTEM, AND METHOD FOR INSTALLING A BRAKING SYSTEM FOR A MOTOR VEHICLE

RELATED APPLICATION INFORMATION

The present application claims priority to and the benefit of German patent application no. 10 2014 225 595.3, which was filed in Germany on Dec. 11, 2014, the disclosure of which is incorporated herein by reference.

FIELD OF THE INVENTION

The present invention relates to a pressure generating apparatus for a braking system of a motor vehicle. The invention further relates to a hydraulic assemblage for interacting with the pressure generating apparatus. The invention additionally relates to a braking system for a motor vehicle. The invention moreover relates to a method for installing a braking system for a motor vehicle

BACKGROUND INFORMATION

Hydraulic vehicle braking systems conventionally have piston pumps to generate brake pressure.

Patent document DE 10 2008 002 740 A1 discusses a piston pump in particular for brake pressure regulation in a hydraulic vehicle braking system. To control the flow of pressure medium, the piston pump has an outlet valve housed in a valve cover. An outflow conduit of the piston pump opens into a pressure medium conduit of a pump housing. This pressure medium conduit is located, when viewed along the longitudinal axis of the piston pump, above an end, located in the interior of the pump housing, of the valve cover.

A cylinder-piston arrangement in which a drive device is furnished which is embodied to displace the piston axially in an opening, provided therefor, of a hydraulic assemblage, can furthermore alternatively be provided for pressure generation.

SUMMARY OF THE INVENTION

The present invention creates a pressure generating apparatus for a braking system of a motor vehicle, having a first housing component that has a flange-shaped portion for coupling the first housing component to a hydraulic assemblage of the braking system, and a hollow-cylindrically embodied portion that is insertable into an opening embodied in the hydraulic assemblage for reception of the first housing component, a piston being axially displaceable in the hollow-cylindrically embodied portion by a screw drive to generate a hydraulic pressure of the braking system, the screw drive having a nut drivable by an electric motor via a transmission gear set, and a spindle, the spindle being axially displaceable by a rotary motion of the nut, the piston being connected to the spindle of the screw drive so that the piston moves along with the spindle of the screw drive; and having a second housing component that has the electric motor for driving the screw drive by the transmission gear set disposed on the first housing component or on the second housing component, the first housing component and the second housing component being fitted together, along an axis disposed parallel to the axial displacement direction of the piston, so that a flange embodied on the second housing component adjacent to the first housing component, which flange is congruent with the flange-shaped portion of the first housing component, is mounted on the flange-shaped portion of the first housing component, and the second housing component completely surrounds the transmission gear set.

The present invention furthermore creates a hydraulic assemblage for interacting with the pressure generating apparatus, which assemblage is embodied so that the flange-shaped portion of the first housing component is couplable to the hydraulic assemblage, and the opening of the hydraulic assemblage is embodied so that the second, hollow-cylindrically embodied portion of the first housing component, in which the piston is axially displaceable, is insertable into the opening of the hydraulic assemblage for reception of the first housing component.

The present invention furthermore creates a braking system for a motor vehicle having the pressure generating apparatus according to the present invention and having the hydraulic assemblage according to the present invention for interacting with the pressure generating apparatus.

The present invention furthermore creates a method for installing a braking system for a motor vehicle. The method encompasses mounting a first housing component of the pressure generating apparatus of the braking system on a second housing component of the pressure generating apparatus of the braking system, the first housing component having a flange-shaped portion for coupling the first housing component to a hydraulic assemblage of the braking system, and a hollow-cylindrically embodied portion in which a piston is axially displaceable by a screw drive to generate a hydraulic pressure of the braking system, the screw drive having a nut drivable by an electric motor via a transmission gear set, and a spindle, the spindle being axially displaceable by a rotary motion of the nut, the piston being connected to the spindle of the screw drive so that the piston moves along with the spindle of the screw drive; and the second housing component having an electric motor for driving the screw drive by the transmission gear set disposed on the first housing component or on the second housing component, the first housing component and the second housing component being fitted together, along an axis disposed parallel to the axial displacement direction of the piston, so that a flange embodied on the second housing component adjacent to the first housing component, which flange is congruent with the flange-shaped portion of the first housing component, is mounted on the flange-shaped portion of the first housing component, and the second housing component completely surrounds the transmission gear set. The method furthermore encompasses mounting of a first portion of the flange of the first housing component on the hydraulic assemblage. The method moreover encompasses a simultaneous insertion of the second, hollow-cylindrically embodied portion of the flange of the first housing component into an opening embodied in the hydraulic assemblage.

An idea of the present invention is to provide a pressure generating apparatus in which a first housing component and an electric motor received in a second housing component are disposed sequentially, and to hydraulically couple the pressure generating apparatus to a hydraulic assemblage. The pressure generating apparatus, like the electric motor, is intended to be a pre-tested unit. Development costs and capital costs can thereby be reduced. It is thus possible to design an overall system that requires the smallest possible box volume. This is advantageous especially with compact vehicles, since they have limited installation space. A further advantage is that a conventional electric motor, for example a brushless DC motor, can be used. Thanks to the compact design of the pressure generating apparatus, for example, penetration of a circuit board of a control apparatus disposed on an opposite side of the hydraulic assemblage can be avoided, which likewise results in a cost reduction.

Advantageous embodiments and refinements are evident from the further descriptions herein and from the description with reference to the Figures.

According to a refinement provision is made that a first opening is embodied on a peripheral surface of the second, hollow-cylindrically embodied portion of the first housing component, which opening is disposed, when the first housing component is in the installed state in the hydraulic assemblage, so that it is connectable to a first hydraulic line, embodied at least in part as a recess, of the hydraulic assemblage, for the outflow of hydraulic fluid from the first housing component via the hydraulic assemblage to an equalizing container. Effective coupling of the first housing component via the first hydraulic line of the hydraulic assemblage to the equalizing container can thereby be achieved.

According to a further refinement provision is made that a second opening is embodied on a peripheral surface of the second, hollow-cylindrically embodied portion of the first housing component, which opening is disposed, when the first housing component is in the installed state in the hydraulic assemblage, so that it is connectable to a second hydraulic line, embodied at least in part as a recess, of the hydraulic assemblage, for the outflow of hydraulic fluid from the first housing component via the hydraulic assemblage to wheel brake cylinders of the braking system and/or for back-venting of hydraulic fluid from the equalizing container via the hydraulic assemblage to the first housing component. Effective coupling of the first housing component to the second hydraulic line of the hydraulic assemblage can thereby be achieved.

According to a further refinement, provision is made that the transmission gear set is embodied by a planetary gear set that is disposed on a side, located opposite the second, hollow-cylindrically embodied portion of the first housing component, of the flange-shaped portion of the first housing component, or on the electric motor of the second housing component. This kind of disposition of the gear set allows the electric motor to be connected directly to the gear set upon connection of the first housing component to the second housing component. A compact design for the pressure generating apparatus can thereby advantageously be achieved.

According to a further refinement, provision is made that the screw drive is embodied by a ball screw drive, the piston being connected to the spindle of the screw drive via a form-locking connection. It is thereby possible to prevent co-rotation of the spindle, or of the piston of the first housing component, from being caused by the rotation of the rotor of the electric motor which causes a nut of the screw drive to rotate.

According to a further refinement, provision is made that the piston has on a peripheral surface at least one protrusion that is receivable, in a cutout embodied in the first housing component and/or the hydraulic assemblage, so that the piston is nonrotatably axially displaceable. The piston can thus be received nonrotatably in the cutout embodied in the hydraulic assemblage.

According to a further refinement, provision is made that a first hydraulic line, embodied at least in part as a recess, for the outflow of hydraulic fluid from the first housing component via the hydraulic assemblage to a compensating container, is embodied in the hydraulic assemblage, which line is disposed, when the first housing component is in the installed state in the hydraulic assemblage, so that it is connectable to a first opening embodied on a peripheral surface of the second, hollow-cylindrically embodied portion of the first housing component. Effective coupling of the first housing component to the first hydraulic line of the hydraulic assemblage can thereby be achieved.

According to a further refinement, provision is made that a second hydraulic line, embodied at least in part as a recess, for the outflow of hydraulic fluid from the first housing component via the hydraulic assemblage to wheel brake cylinders of the braking system and/or for back-venting of hydraulic fluid from the compensating container via the hydraulic assemblage to the first housing component, is embodied in the hydraulic assemblage, which line is disposed, when the first housing component is in the installed state in the hydraulic assemblage, so that it is connectable to a second opening embodied on a peripheral surface of the second, hollow-cylindrically embodied portion of the first housing component. Effective coupling of the first housing component to the second hydraulic line of the hydraulic assemblage can thereby be achieved.

According to a further refinement, provision is made that the first hydraulic line, embodied at least in part as a recess, of the hydraulic assemblage, for the outflow of hydraulic fluid from the first housing component via the hydraulic assemblage to the compensating container, and the second hydraulic line, embodied at least in part as a recess, of the hydraulic assemblage, for the outflow of hydraulic fluid from the first housing component via the hydraulic assemblage to wheel brake cylinders of the braking system and/or for back-venting of hydraulic fluid from the compensating container via the hydraulic assemblage to the first housing component, are disposed substantially tangentially to the opening of the hydraulic assemblage for reception of the first housing component, and contact the opening directly or via an orifice disposed radially with respect to the opening of the hydraulic assemblage. Simple and secure contacting of the first line to the opening of the hydraulic assemblage can thereby be achieved.

According to a further refinement, provision is made that upon insertion of the second, hollow-cylindrically embodied portion of the flange of the first housing component into the opening embodied in the hydraulic assemblage, a first opening, embodied on a peripheral surface of the second, hollow-cylindrically embodied portion of the flange, is connected to a first hydraulic line, embodied at least in part as a recess, for the outflow of hydraulic fluid from the first housing component via the hydraulic assemblage to an equalizing container. Simple, reliable, and space-optimized disposition of the first housing component in the hydraulic assemblage can thereby be achieved.

According to a further refinement, provision is made that upon insertion of the second, hollow-cylindrically embodied portion of the flange of the first housing component into the opening embodied in the hydraulic assemblage, a second opening embodied on a peripheral surface of the second, hollow-cylindrically embodied portion of the flange is connected to a second hydraulic line, embodied at least in part as a recess, for the outflow of hydraulic fluid from the first housing component via the hydraulic assemblage to wheel brake cylinders of the braking system and/or for back-venting of hydraulic fluid from the equalizing container via the hydraulic assemblage to the first housing component.

Simple, reliable, and space-optimized disposition of the first housing component in the hydraulic assemblage can thereby be achieved.

According to a further refinement, provision is made that the first hydraulic line, embodied at least in part as a recess, of the hydraulic assemblage, for the outflow of hydraulic fluid from the first housing component via the hydraulic assemblage to the compensating container, and the second hydraulic line, embodied at least in part as a recess, for the outflow of hydraulic fluid from the first housing component via the hydraulic assemblage to wheel brake cylinders of the braking system and/or for back-venting of hydraulic fluid from the compensating container via the hydraulic assemblage to the first housing component, are disposed substantially tangentially to the opening of the hydraulic assemblage for reception of the first housing component, and contact the opening directly or via an orifice disposed radially with respect to the opening of the hydraulic assemblage. Simple and secure contacting of respective lines of the first housing component and of the second housing component to the opening of the hydraulic assemblage can thereby be achieved.

The embodiments and refinements that have been described can be combined in any way with one another.

Further possible embodiments, refinements, and implementations of the invention also encompass combinations, not explicitly recited, of features of the invention that are described above or hereinafter with reference to the exemplifying embodiments.

The appended drawings are intended to provide further elucidation of the embodiments of the invention. They illustrate embodiments, and in combination with the description serve to explain principles and concepts of the invention.

Other embodiments, and many of the advantages recited, may be gathered with reference to the drawings. The elements depicted in the drawings are not necessarily shown accurately to scale with one another.

In the Figures of the drawings, identical reference characters denote identical or functionally identical elements, constituents, or components unless indicated to the contrary.

BRIEF DESCRIPTION OF THE DRAWINGS

FIG. 4b is a cross-sectional view of a pressure generating apparatus installed on the hydraulic assemblage, according to the embodiment of the invention.

FIG. 5 is a flow chart of a method for installing the braking system for a motor vehicle, according to the embodiment of the invention.

DETAILED DESCRIPTION

Figure 1:
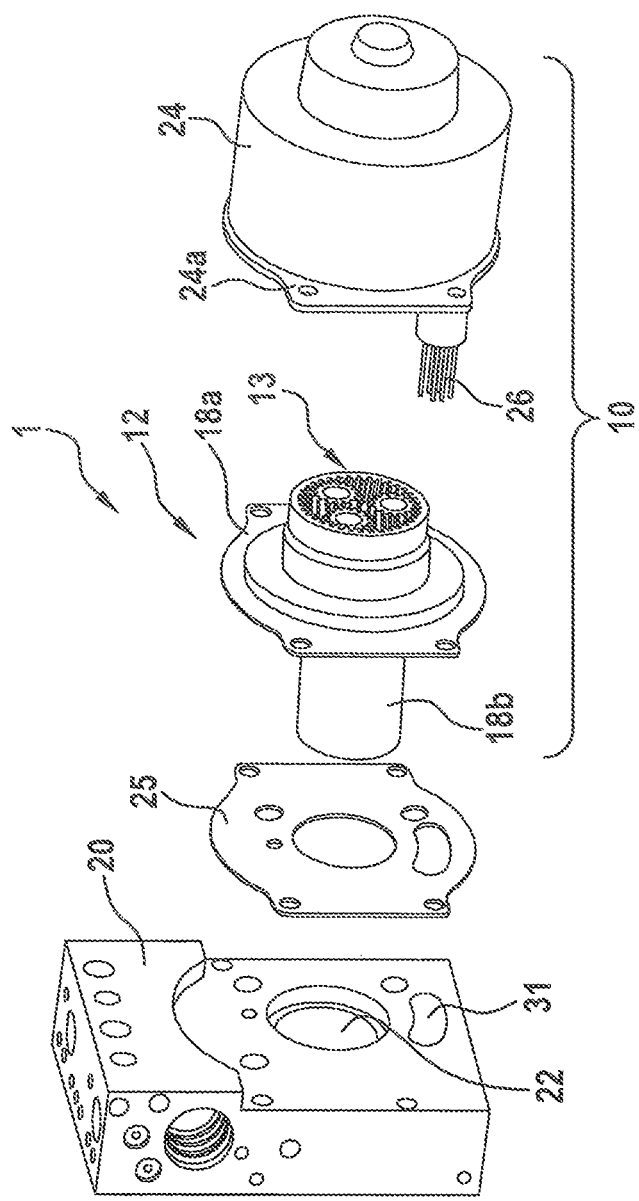
FIG. 1 is an exploded view of a sub-region of a braking system of a motor vehicle, according to a embodiment of the invention.

FIG. 1 is an exploded view of a sub-region of a braking system of a motor vehicle, according to a embodiment of the invention.

Braking system 1 has a pressure generating apparatus 10 and a hydraulic assemblage 20. Other components of braking system 1 are not further described in the interest of simplification.

Pressure generating apparatus 10 is embodied so that it is mountable on hydraulic assemblage 20. Hydraulic assemblage 20 has an opening 22 that is embodied to receive a first housing component 12 of pressure generating apparatus 10. In the installed state, a sealing element 25 is disposed between pressure generating apparatus 10 and hydraulic assemblage 20 to seal the connection between pressure generating apparatus 10 and hydraulic assemblage 20.

Pressure generating apparatus 10 has first housing component 12 as well as a second housing component 24 that has an electric motor. First housing component 12 has a flange-shaped portion 18a for coupling first housing component 12 onto hydraulic assemblage 20 of braking system 1, and a hollow-cylindrically embodied portion 18b that is insertable into opening 22 embodied in hydraulic assemblage 20 for the reception of first housing component 12.

First housing component 12 and second housing component 24 are fitted together, which may be along an axis disposed parallel to the axial displacement direction of piston 16, so that a flange 24a embodied on second housing component 24 adjacent to first housing component 12, which flange is congruent with flange-shaped portion 18a of first housing component 12, is mounted on flange-shaped portion 18a of first housing component 12, and second housing component 24 completely surrounds transmission gear set 13. The axis disposed parallel to the axial displacement direction of piston 16 may be identical to the axial displacement direction of piston 16.

Transmission gear set 13 may be embodied as a planetary gear set that is disposed on a side, located opposite the second, hollow-cylindrically embodied portion 18b of first housing component 12, of first portion 18a of first housing component 12.

Second portion 18b of first housing component 12 may be insertable in a form-locking manner into opening 22 of hydraulic assemblage 20. In the present exemplifying embodiment, both second portion 18b of first housing component 12 and opening 22 of hydraulic assemblage 20 are of cylindrical configuration. Alternatively, they can also have a different suitable shape that is suitable for providing a form-locking connection between second portion 18b and opening 22 of hydraulic assemblage 20.

Second housing component 24 furthermore has a connector 26 for coupling to a control apparatus of braking system 1. Hydraulic assemblage 20 may have an orifice 31 for the reception of connector 26, so that connector 26 is guidable through hydraulic assemblage 20. Orifice 31 of hydraulic assemblage 20 may be disposed below opening 22 for the reception of first housing component 12. Alternatively, orifice 31 can also be provided at a different suitable location in the housing of hydraulic assemblage 20.

Figure 2:
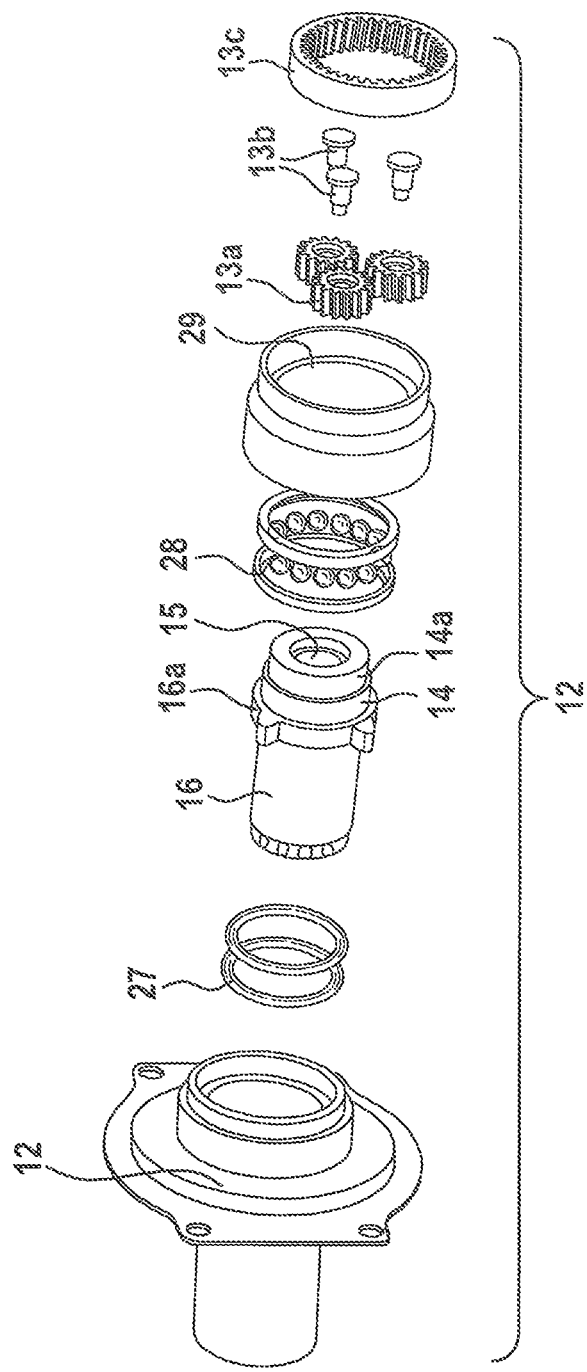
FIG. 2 is an exploded view of a first housing component according to the embodiment of the invention.

FIG. 2 is an exploded view of a first housing component according to the embodiment of the invention.

A piston 16 is axially displaceable by a screw drive 14 in hollow-cylindrically embodied portion 18b, to generate a hydraulic pressure of braking system 1, screw drive 14 having a nut 14a drivable by an electric motor via a transmission gear set 13, and a spindle 15, spindle 15 being axially displaceable by a rotary motion of nut 14a, piston 16 being connected to spindle 15 of screw drive 14 so that piston 16 moves along with the spindle of screw drive 14.

The axially displaceable piston 16 is insertable into first housing component 12. The axially displaceable piston 16 is drivable by a screw drive 14. Screw drive 14 may be embodied by a ball screw drive. A spindle 15 of screw drive 14 is advantageously connected to the axially displaceable piston 16 of first housing component 12 by a threaded connection. Alternatively, spindle 15 of screw drive 14 can be connected to the axially displaceable piston 16 of first housing component 12, for example, by a welded connection.

A seal 27 embodied by two sealing rings is furthermore disposed between first housing component 12 and the axially displaceable piston 16. The sealing rings hydraulically seal off an interior space of second portion 18b of first housing component 12. A bearing element 28 and a support element 29 are furthermore provided on a drive side of the axially displaceable piston 16. Gear set 13 furthermore has a plurality of planet gears 13a, bolts 13b insertable into planet gears 13a, and a ring gear 13c that is in engagement with planet gears 13a. A sun gear connected to a drive shaft of the electric motor (not shown in FIG. 2) is in engagement with planet gears 13a of gear set 13 when the pressure generating apparatus is in the installed state.

Figure 3:
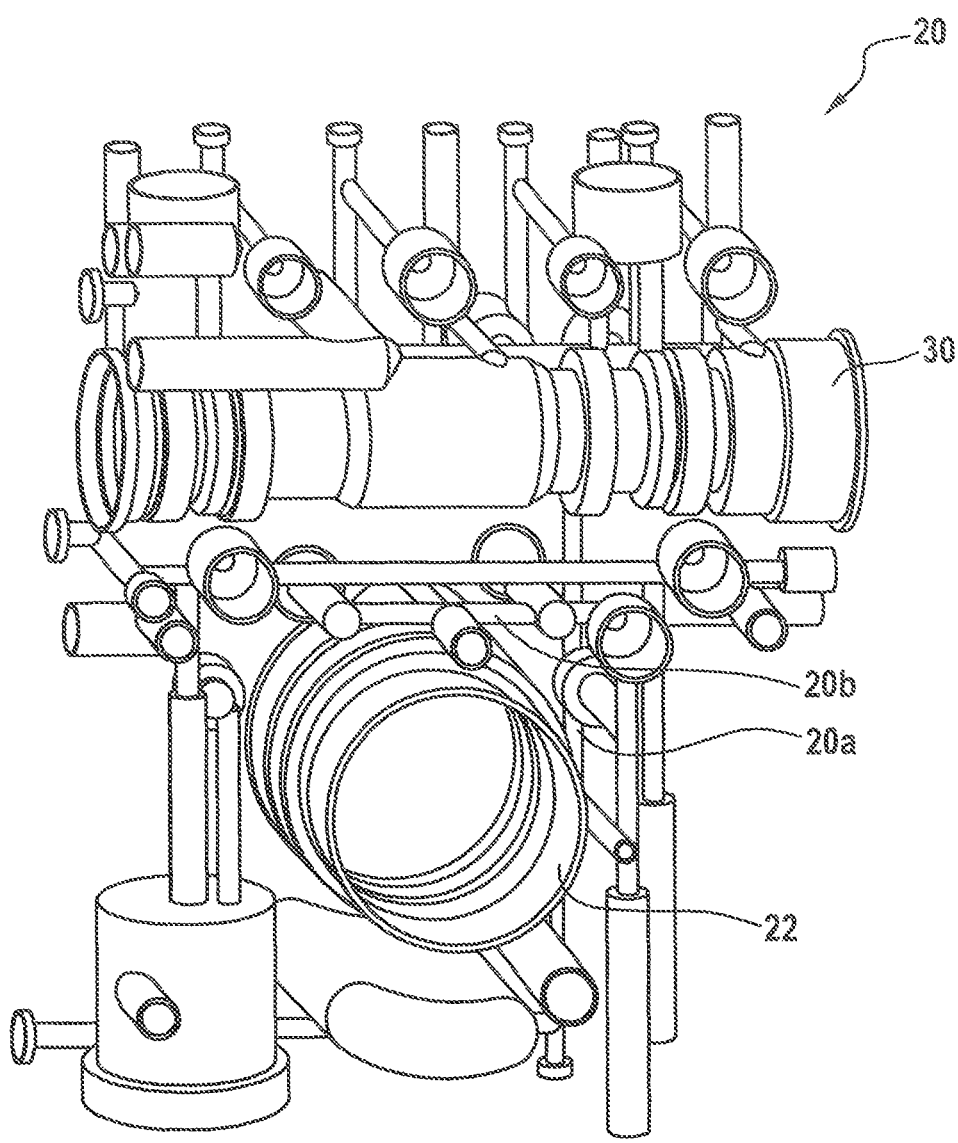
FIG. 3 schematically depicts a line layout of a hydraulic assemblage, according to the embodiment of the invention.

FIG. 3 schematically depicts a line layout of a hydraulic assemblage according to the embodiment of the invention.

Opening 22 embodied in hydraulic assemblage 20, for reception of first housing component 12 (not shown in FIG. 3), is disposed in hydraulic assemblage 20 substantially centeredly and below a tandem master cylinder 30 of braking system 1. Opening 22 of hydraulic assemblage 20 is connected to a first hydraulic line 20a for the outflow of hydraulic fluid from first housing component 12 (not shown in FIG. 3) via hydraulic assemblage 20 to a compensating container.

First hydraulic line 20a may have the function of volume equalization between an internal volume of the second, hollow-cylindrically embodied portion 18b of first housing component 12 and the equalizing container.

Upon volume equalization, the pressure generating apparatus being in a state in which the axially displaceable piston of first housing component 12 is disposed in a retracted position or zero position, hydraulic fluid flows from first housing component 12 via hydraulic assemblage 20 to the equalizing container, so that in the case of an expansion (resulting, for example, from heating) of hydraulic fluid, no unintended pressure is generated in the lines. First hydraulic line 20a is connected for this purpose to the equalizing container (not shown in FIG. 3).

Opening 22 of hydraulic assemblage 20 is furthermore connected to a second hydraulic line 20b for the outflow of hydraulic fluid from first housing component 12 (not shown in FIG. 3) via hydraulic assemblage 20 to wheel brake cylinders of braking system 1, and for back-venting of hydraulic fluid from the equalizing container via hydraulic assemblage 20 to first housing component 12. Alternatively, a hydraulic line for back-venting of hydraulic fluid from the equalizing container via hydraulic assemblage 20 to first housing component 12 can also be provided separately from second hydraulic line 20b. First hydraulic line 20a and second hydraulic line 20b may be each embodied as recesses.

Second hydraulic line 20b thus may have two functions. On the one hand, upon generation of a pressure, by the axially displaceable piston of first housing component 12, hydraulic fluid flows from first housing component 12 to hydraulic assemblage 20 and from there to wheel brake cylinders of braking system 1.

On the other hand, second hydraulic line 20b serves for back-venting of hydraulic fluid, upon a return of the piston of first housing component 12 from an extended position into the retracted position or zero position, from the equalizing container via hydraulic assemblage 20 to first housing component 12.

First hydraulic line 20a and second hydraulic line 20b are disposed substantially tangentially to opening 22 of hydraulic assemblage 20. First hydraulic line 20a and second hydraulic line 20b are connected to opening 22 of hydraulic assemblage 20 which may be by an orifice disposed radially with respect to opening 22 of hydraulic assemblage 20.

Alternatively, first hydraulic line 20a and second hydraulic line 20b can also be connected directly to opening 22 of hydraulic assemblage 20.

First hydraulic line 20a for the outflow of hydraulic fluid from first housing component 12 (not shown in FIG. 3) via hydraulic assemblage 20 to the equalizing container may be disposed so that it is connectable, when first housing component 12 is in the installed state in hydraulic assemblage 20, to first opening 19a embodied on the peripheral surface of the second, hollow-cylindrically embodied portion of first housing component 12.

Second hydraulic line 20b may be disposed so that it is connectable, when first housing component 12 is in the installed state in hydraulic assemblage 20, to second opening 19b embodied on the peripheral surface of the second, hollow-cylindrically embodied portion 18b of first housing component 12.

Figure 4A:
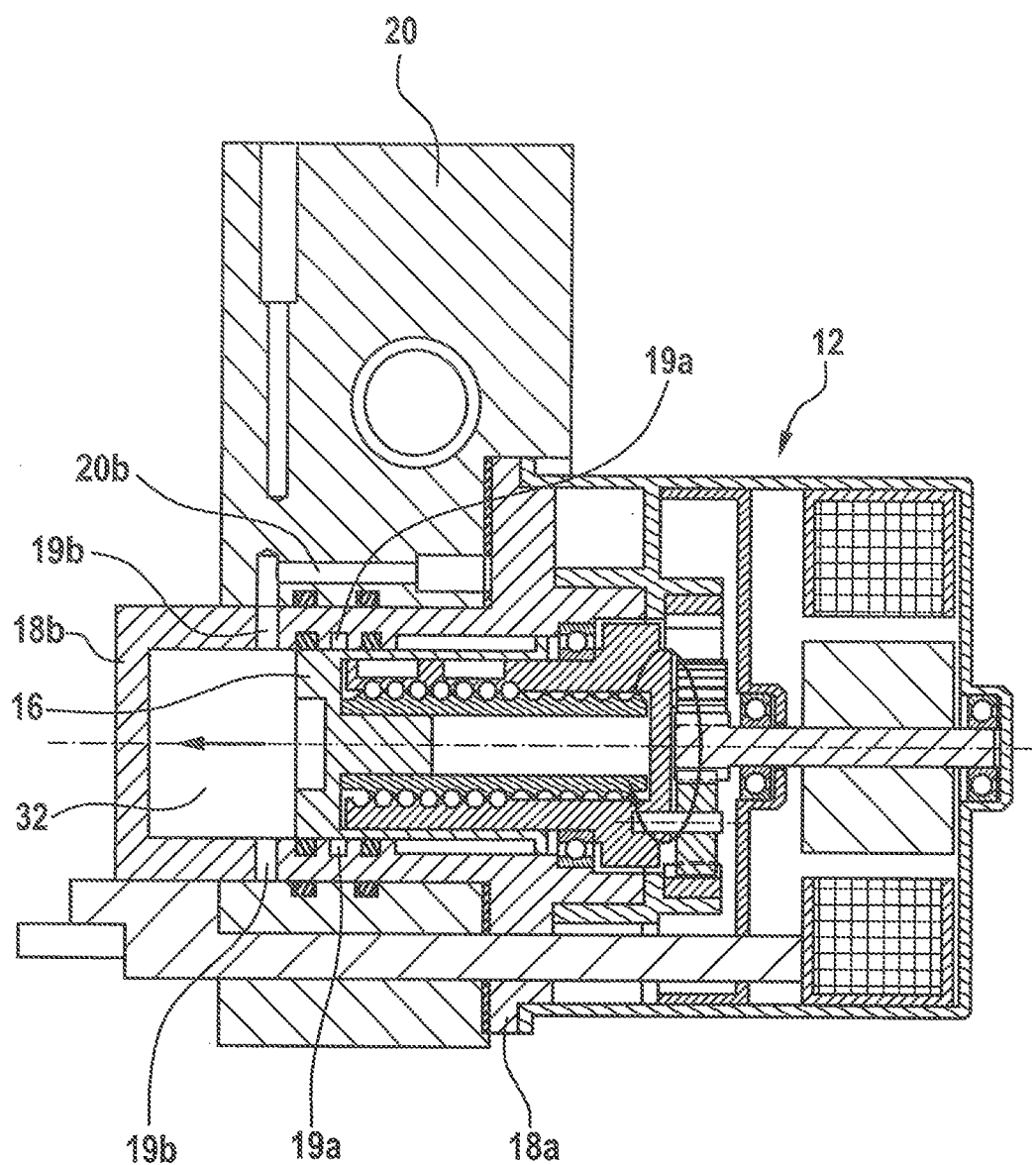
FIG. 4a is a cross-sectional view of a pressure generating apparatus installed on the hydraulic assemblage, according to the embodiment of the invention.

FIG. 4a is a cross-sectional view of a pressure generating apparatus installed on the hydraulic assemblage, according to the embodiment of the invention.

FIG. 4a shows the axially displaceable piston 16 of first housing component 12 in a retracted position. With piston 16 in the present position, a pressure space or cylinder volume 32 of first housing component 12 is maximal. When piston 16 is axially displaced by screw drive 14, a pressure buildup occurs. Hydraulic fluid flows by second hydraulic line 20b (not shown in FIG. 4a) from first housing component 12 via hydraulic assemblage 20 to wheel brake cylinders of braking system 1.

First housing component 12 may be disposed so that it penetrates through hydraulic assemblage 20 in the region of the second, hollow-cylindrically embodied portion 18b of first housing component 12. It is thereby advantageously possible to achieve a more compact configuration of the braking system that encompasses pressure generating apparatus 10 installed on hydraulic assemblage 20.

FIG. 4b is a cross-sectional view of a pressure generating apparatus installed on the hydraulic assemblage, according to the embodiment of the invention.

FIG. 4b shows the axially displaceable piston of first housing component 12 in a completely extended position. With piston 16 in the present position, piston 16 is disposed at a distal end portion of the hollow-cylindrically embodied portion 18b of first housing component 12. When piston 16 is moved back toward a retracted position, hydraulic fluid then flows, by second hydraulic line 20b for back-venting, from the equalizing container via hydraulic assemblage 20 to first housing component 12.

FIG. 5 is a flow chart of a method for installing the braking system for a motor vehicle, according to the embodiment of the invention.

The method encompasses mounting S1 a first housing component of the pressure generating apparatus of the braking system on a second housing component of the pressure generating apparatus of the braking system, the first housing component having a flange-shaped portion for coupling the first housing component to a hydraulic assemblage of the braking system, and a hollow-cylindrically embodied portion in which a piston is axially displaceable by a screw drive to generate a hydraulic pressure of the braking system, the screw drive having a nut drivable by an electric motor via a transmission gear set, and a spindle, the spindle being axially displaceable by a rotary motion of the nut, the piston being connected to the spindle of the screw drive so that the piston moves along with the spindle of the screw drive; and the second housing component having an electric motor for driving the screw drive by the transmission gear set disposed on the first housing component or on the second housing component, the first housing component and the second housing component being fitted together, along an axis disposed parallel to the axial displacement direction of the piston, so that a flange embodied on the second housing component adjacent to the first housing component, which flange is congruent with the flange-shaped portion of the first housing component, is mounted on the flange-shaped portion of the first housing component, and the second housing component completely surrounds the transmission gear set.

The method further encompasses mounting (S2) a first portion of the flange of the first housing component on the hydraulic assemblage. The method furthermore encompasses simultaneous insertion of the second, hollow-cylindrically embodied portion of the flange of the first housing component into an opening embodied in the hydraulic assemblage.

Upon insertion S3 of the second, hollow-cylindrically embodied portion of the flange of the first housing component into the opening embodied in the hydraulic assemblage, a first opening embodied on a peripheral surface of the second, hollow-cylindrically embodied portion of the flange is connected S4 to a first hydraulic line, embodied at least in part as a recess, of the hydraulic assemblage, for the outflow of hydraulic fluid from the first housing component via the hydraulic assemblage to an equalizing container.

Upon insertion S3 of the second, hollow-cylindrically embodied portion of the flange of the first housing component into the opening embodied in the hydraulic assemblage, a second opening embodied on a peripheral surface of the second, hollow-cylindrically embodied portion of the flange is furthermore connected S5 to a second hydraulic line, embodied at least in part as a recess, for the outflow of hydraulic fluid from the first housing component via the hydraulic assemblage to wheel brake cylinders of the braking system and for back-venting of hydraulic fluid from the compensating container via the hydraulic assemblage to the first housing component. Alternatively, a hydraulic line for back-venting of hydraulic fluid from the equalizing container via the hydraulic assemblage to the first housing component can also be provided separately from the second hydraulic line.

The first hydraulic line, embodied at least in part as a recess, of the hydraulic assemblage, for the outflow of hydraulic fluid from the first housing component via the hydraulic assemblage to the compensating container, and the second hydraulic line, embodied at least in part as a recess, of the hydraulic assemblage, for the outflow of hydraulic fluid from the first housing component via the hydraulic assemblage to wheel brake cylinders of the braking system and for back-venting of hydraulic fluid from the compensating container via the hydraulic assemblage to the first housing component, are disposed substantially tangentially to the opening of the hydraulic assemblage for reception of the first housing component, and contact the opening directly or via an orifice disposed radially with respect to the opening of the hydraulic assemblage.

Although the present invention was described above with reference to exemplifying embodiments, it is not limited thereto but instead is modifiable in many ways. In particular, the invention can be changed or modified in a multiplicity of ways without deviating from the essence of the invention.

For example, a different suitable drive system can also be provided for energy transfer between the electric motor and the first housing component. Guidance of the piston of the first housing component can furthermore be provided in a different manner, and using other suitable bearing elements.

What is claimed is:

1. A pressure generating apparatus for a braking system of a motor vehicle, comprising:
    a first housing component having a flange-shaped portion to couple the first housing component to a hydraulic assemblage of the braking system, and a hollow-cylindrically embodied portion that is insertable into an opening in the hydraulic assemblage for receiving the first housing component, a piston being axially displaceable in the hollow-cylindrically embodied portion by a screw drive to generate a hydraulic pressure of the braking system, the screw drive having a nut drivable by an electric motor via a transmission gear set, and a spindle, the spindle being axially displaceable by a rotary motion of the nut, the piston being connected to the spindle of the screw drive so that the piston moves along with the spindle of the screw drive; and
    a second housing component having the electric motor for driving the screw drive by the transmission gear set disposed on the first housing component or on the second housing component, the first housing component and the second housing component being fitted together, along an axis disposed parallel to the axial displacement direction of the piston, so that a flange embodied on the second housing component adjacent to the first housing component, which flange is congruent with the flange-shaped portion of the first housing component, is mounted on the flange-shaped portion of the first housing component, and the second housing component completely surrounds the transmission gear set.

2. The pressure generating apparatus of claim 1, wherein a first opening is on a peripheral surface of the second, hollow-cylindrically embodied portion of the first housing component, which opening is disposed, when the first housing component is in an installed state in the hydraulic assemblage, so that it is connectable to a first hydraulic line, embodied at least in part as a recess, of the hydraulic assemblage, for the outflow of hydraulic fluid from the first housing component via the hydraulic assemblage to an equalizing container.

3. The pressure generating apparatus of claim 1, wherein a second opening is on a peripheral surface of the second, hollow-cylindrically embodied portion of the first housing component, which opening is disposed, when the first housing component is in an installed state in the hydraulic assemblage, so that it is connectable to a second hydraulic line, embodied at least in part as a recess, of the hydraulic assemblage, for the outflow of hydraulic fluid from the first housing component via the hydraulic assemblage to wheel brake cylinders of the braking system and/or for back-venting of hydraulic fluid from the equalizing container via the hydraulic assemblage to the first housing component.

4. The pressure generating apparatus of claim 1, wherein the transmission gear set is embodied by a planetary gear set that is disposed on a side, located opposite the second, hollow-cylindrically embodied portion of the first housing component, of the flange-shaped portion of the first housing component, or on the electric motor of the second housing component.

5. The pressure generating apparatus of claim 1, wherein the screw drive is embodied by a ball screw drive, the piston being connected to the spindle of the screw drive via a form-locking connection.

6. The pressure generating apparatus of claim 1, wherein the piston has on an outer peripheral surface at least one protrusion that is receivable, in a cutout embodied in the first housing component and/or the hydraulic assemblage, so that the piston is nonrotatably axially displaceable.

7. A hydraulic assemblage of a braking system for interacting with a pressure generating apparatus, comprising:
  an hydraulic assembly configured to be coupleable to a flange-shaped portion of the first housing component, and having an opening embodied so that a second, hollow-cylindrically embodied portion of the first housing component, in which a piston is axially displaceable, is insertable into the opening for receiving the first housing component;
  wherein the pressure generating apparatus includes:
    the first housing component having the flange-shaped portion to couple to the hydraulic assembly, and the hollow-cylindrically embodied portion that is insertable into the opening in the hydraulic assembly for receiving the first housing component, the piston being axially displaceable in the hollow-cylindrically embodied portion by a screw drive to generate a hydraulic pressure of the braking system, the screw drive having a nut drivable by an electric motor via a transmission gear set, and a spindle, the spindle being axially displaceable by a rotary motion of the nut, the piston being connected to the spindle of the screw drive so that the piston moves along with the spindle of the screw drive; and
    a second housing component having the electric motor for driving the screw drive by the transmission gear set disposed on the first housing component or on the second housing component, the first housing component and the second housing component being fitted together, along an axis disposed parallel to the axial displacement direction of the piston, so that a flange embodied on the second housing component adjacent to the first housing component, which flange is congruent with the flange-shaped portion of the first housing component, is mounted on the flange-shaped portion of the first housing component, and the second housing component completely surrounds the transmission gear set.

8. The hydraulic assemblage of claim 7, wherein a first hydraulic line, embodied at least in part as a recess, for the outflow of hydraulic fluid from the first housing component via the hydraulic assemblage to a compensating container, is embodied in the hydraulic assembly, which line is disposed, when the first housing component is in an installed state in the hydraulic assembly, so that it is connectable to a first opening embodied on a peripheral surface of the second, hollow-cylindrically embodied portion of the first housing component.

9. The hydraulic assemblage of claim 7, wherein a second hydraulic line, embodied at least in part as a recess, for the outflow of hydraulic fluid from the first housing component via the hydraulic assembly to wheel brake cylinders of the braking system and/or for back-venting of hydraulic fluid from the compensating container via the hydraulic assemblage to the first housing component, is embodied in the hydraulic assembly, which line is disposed, when the first housing component is in an installed state in the hydraulic assembly, so that it is connectable to a second opening on a peripheral surface of the second, hollow-cylindrically embodied portion of the first housing component.

10. The hydraulic assemblage of claim 8, wherein the first hydraulic line, embodied at least in part as a recess, for the outflow of hydraulic fluid from the first housing component via the hydraulic assembly to a compensating container, and the second hydraulic line, embodied at least in part as a recess, for the outflow of hydraulic fluid from the first housing component via the hydraulic assembly to wheel brake cylinders of the braking system and/or for back-venting of hydraulic fluid from the compensating container via the hydraulic assembly to the first housing component, are disposed substantially tangentially to the opening of the hydraulic assembly to receive the first housing component, and contact the opening directly or via an orifice disposed radially with respect to the opening of the hydraulic assembly.

11. A braking system for a motor vehicle, comprising:
  a pressure generating apparatus; and
  a hydraulic assemblage for interacting with the pressure generating apparatus;
  wherein the pressure generating apparatus includes:
    a first housing component having a flange-shaped portion to couple the first housing component to a hydraulic assemblage of the braking system, and a hollow-cylindrically embodied portion that is insertable into an opening in the hydraulic assemblage for receiving the first housing component, a piston being axially displaceable in the hollow-cylindrically embodied portion by a screw drive to generate a hydraulic pressure of the braking system, the screw drive having a nut drivable by an electric motor via a transmission gear set, and a spindle, the spindle being axially displaceable by a rotary motion of the nut, the piston being connected to the spindle of the screw drive so that the piston moves along with the spindle of the screw drive; and
    a second housing component having the electric motor for driving the screw drive by the transmission gear set disposed on the first housing component or on the second housing component, the first housing component and the second housing component being fitted together, along an axis disposed parallel to the axial displacement direction of the piston, so that a flange embodied on the second housing component adjacent to the first housing component, which flange is congruent with the flange-shaped portion of the first housing component, is mounted on the flange-shaped portion of the first housing component, and the second housing component completely surrounds the transmission gear set; and
  wherein the hydraulic assemblage is configured to be coupleable to the flange-shaped portion of the first housing component, and having an opening embodied so that a second, hollow-cylindrically embodied portion of the first housing component, in which a piston is axially displaceable, is insertable into the opening for receiving the first housing component.

12. A method for installing a braking system for a motor vehicle, the method comprising:
  mounting a first housing component of the a pressure generating apparatus of the braking system on a second housing component of the pressure generating apparatus, the first housing component having a flange-shaped portion to couple the first housing component to a hydraulic assemblage of the braking system, and a hollow-cylindrically embodied portion in which a piston is axially displaceable by a screw drive to generate a hydraulic pressure of the braking system, the screw drive having a nut drivable by an electric motor via a transmission gear set, and a spindle, the spindle being axially displaceable by a rotary motion of the nut, the piston being connected to the spindle of the screw drive so that the piston moves along with the spindle of the screw drive; and the second housing component having an electric motor for driving the screw drive by the transmission gear set disposed on the first housing component or on the second housing component, the first housing component and the second housing component being fitted together, along an axis disposed parallel to the axial displacement direction of the piston, so that a flange embodied on the second housing component adjacent to the first housing component, which flange is congruent with the flange-shaped portion of the first housing component, is mounted on the flange-shaped portion of the first housing component, and the second housing component completely surrounds the transmission gear set;

mounting a first portion of the flange of the first housing component on the hydraulic assemblage; and simultaneously inserting the second, hollow-cylindrically embodied portion of the flange of the first housing component into an opening in the hydraulic assemblage.

13. The method of claim 12, wherein upon insertion of the second, hollow-cylindrically embodied portion of the flange of the first housing component into the opening embodied in the hydraulic assemblage, a first opening, embodied on a peripheral surface of the second, hollow-cylindrically embodied portion of the flange, is connected to a first hydraulic line, embodied at least in part as a recess, of the hydraulic assemblage, for the outflow of hydraulic fluid from the first housing component via the hydraulic assemblage to an equalizing container.

14. The method of claim 12, wherein upon insertion of the second, hollow-cylindrically embodied portion of the flange of the first housing component into the opening embodied in the hydraulic assemblage, a second opening embodied on a peripheral surface of the second, hollow-cylindrically embodied portion of the flange is connected to a second hydraulic line, embodied at least in part as a recess, for the outflow of hydraulic fluid from the first housing component via the hydraulic assemblage to wheel brake cylinders of the braking system and/or for back-venting of hydraulic fluid from the equalizing container via the hydraulic assemblage to the first housing component.

15. The method of claim 13, wherein the first hydraulic line, embodied at least in part as a recess, of the hydraulic assemblage, for the outflow of hydraulic fluid from the first housing component via the hydraulic assemblage to the compensating container, and the second hydraulic line, embodied at least in part as a recess, for the outflow of hydraulic fluid from the first housing component via the hydraulic assemblage to wheel brake cylinders of the braking system and/or for back-venting of hydraulic fluid from the compensating container via the hydraulic assemblage to the first housing component, are disposed substantially tangentially to the opening of the hydraulic assemblage to receive the first housing component, and contact the opening directly or via an orifice disposed radially with respect to the opening of the hydraulic assemblage.

* * * * *